No. 634,751. Patented Oct. 10, 1899.
O. HOFMANN.
METHOD OF REFINING CUPRIC SULFATE SOLUTIONS.
(Application filed May 24, 1899.)
(No Model.)
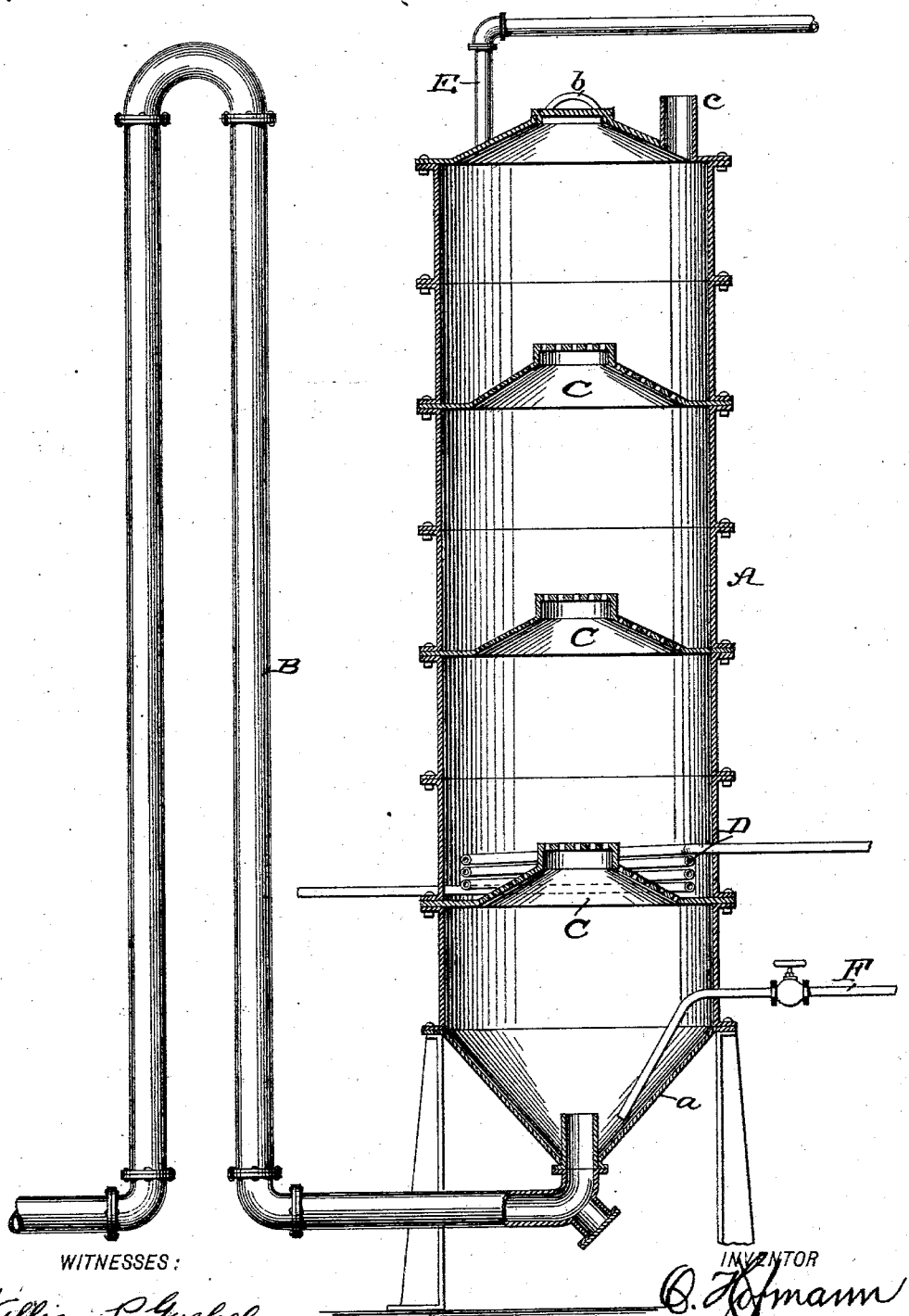

UNITED STATES PATENT OFFICE.

OTTOKAR HOFMANN, OF ARGENTINE, KANSAS.

METHOD OF REFINING CUPRIC-SULFATE SOLUTIONS.

SPECIFICATION forming part of Letters Patent No. 634,751, dated October 10, 1899.

Application filed May 24, 1899. Serial No. 718,095. (No specimens.)

*To all whom it may concern:*

Be it known that I, OTTOKAR HOFMANN, of Argentine, in the county of Wyandotte and State of Kansas, have invented a new and Improved Method of Treating Cupric-Sulfate Solutions, of which the following is a full, clear, and exact description.

The object of the invention is to provide a new and improved method for treating cupric sulphate solutions to bring the same into a purified condition for direct manufacture into blue vitriol or other articles or for use in chemical and metallurgical processes.

The method consists, essentially, in refining crude cupric sulphate solution by precipitating the impurities contained therein by the addition of cupric oxide and the injection of air.

If copper matte (a product of smelting and consisting principally of copper and iron sulphide or a sulphureted copper ore) after being subjected to an oxidizing roasting is treated with hot diluted sulphuric acid, then a solution of cupric sulphate is obtained which contains large quantities of iron, besides more or less arsenic, antimony, nickel, cobalt, &c. Such an impure cupric sulphate solution is not suitable for the manufacture of blue vitriol because the impurities, especially the ferrous sulphate, also crystallize out of the concentrated solution and make the product of blue vitriol too impure for the market. There is no practical and rational method known by which a cupric sulphate solution can be freed from the above-named impurities, and the manufacturers are obliged in order to produce a pure solution to eliminate the impurities from the material before it is subjected to the action of the diluted sulphuric acid, and this is a costly process. There are two methods in use for purifying the copper material. One is a very slow method, and consists in converting the copper sulphide of the matte into metallic copper by repeated roasting and smelting operations, and then the metallic copper is granulated and dissolved by the alternating action of air and hot diluted sulphuric acid. The other method is to concentrate the copper in the matte by repeated roasting and smelting until the same contains about from eighty to eighty-five per cent. copper. By this repeated roasting and smelting the largest portion of the iron and other impurities are oxidized and go in the slag. This highly-concentrated matte is pulverized, roasted, and treated with sulphuric acid. This method involves great expense and results in a considerable loss of copper.

By my new method the crude cupric sulphate solution is refined, and refining of the material is therefore not required. Any copper matte or sulphureted copper ore rich or poor in copper after roasting furnishes a suitable material.

In order to carry the above-mentioned method into effect, I proceed in detail as follows: Common copper matte or sulphureted copper ore is pulverized and oxidized by roasting and treated with hot diluted sulphuric acid either in an agitating-tank or in a leaching-tank. Attention has to be paid that the resulting cupric sulphate solution is neutral or as nearly neutral as possible. The neutral crude solution is charged into a suitable receptacle, most conveniently into a high tank or tower, preferably made of a cast-iron skeleton frame and lined with heavy sheet-lead. Within the tower is a steam-coil for heating the solution, and an air-pipe, to be connected with an air-compressor or other air-forcing apparatus, enters the bottom of the tower. When the tower is charged with solution, steam is turned into the coil and the solution heated to about 75° to 80° centigrade. Then air is forced through the solution and pulverized cupric oxide added in required quantities, which depend on the amount of impurities contained in the solution and the amount of free acid, if any, present. As the roasted matte contains a large amount of cupric oxide, roasted matte can be used to great advantage in place of pure cupric oxide. The ascending air keeps the particles of matte or cupric oxide suspended and in motion. After from three to four hours of operation the above-named impurities, together with some basic sulphate of copper, are precipitated. The end of the operation is ascertained by test for iron. Then the liquor, together with the precipitate, is discharged into an agitating-tank and from there by means of a pressure-tank forced into a filter-press. The solution leaving the press is now free from iron, arsenic, antimony, nickel, and cobalt and can be directly subjected to evaporation for the manufacture of blue vitriol or used for any other technical purpose. To free the precipitate from the basic sulphate of copper, the same when removed from the press is treated in an agitating-tank with a cold and weak acid, (about two per cent.) Such weak acid will readily dissolve the basic copper, while it will only slightly attack the oxides of the precipitated impurities.

The chemical reaction in this process can be expressed by the following equation:

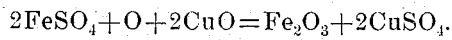
$$2FeSO_4 + O + 2CuO = Fe_2O_3 + 2CuSO_4.$$

It will be seen that the cupric oxide which is used, together with air, to precipitate the iron combines with the sulphuric acid of the ferrous sulphate and goes in solution as cupric sulphate, which is an advantageous feature of the process, because the precipitant is converted into the same chemical substance from which it eliminated the impurities, making the solution stronger in copper.

The crystals of blue vitriol obtained by my method are much purer and more permanent than those usually found in the market, because they crystallize out of a very pure neutral solution and do not contain any free acid. They can be exposed to light for years and do not lose their blue color and turn white. Direct sunlight, however, has to be avoided. This method is much less expensive than others in use and does not require so costly and extensive a plant. When air alone is forced through the solution without an addition of cupric oxide, a part of the iron precipitates as basic sulphate.

In the drawing is shown in sectional elevation an apparatus by which my method may be carried out. This apparatus consists of a tower A, having a funnel-shaped bottom $a$ and provided in its top with a manhole $b$, through which the matte may be charged, and with an air-vent $c$. Into the funnel-shaped bottom of the tower enters the air-pipe B, which is to be connected with an air-compressor, and the end of the said pipe projects from twelve to eighteen inches into the tower, as shown. To prevent the solution from flowing into the compressor, the pipe B extends upward above the top of the tower and is then carried downwardly for connection with the compressor. Within the tower, one above the other, are arranged the perforated cones C. These cones serve to divide and break up the air and prevent a central stream of air from ascending through the solution. Surrounding the lowermost cone C is the steam-coil D, which is to be connected with any suitable source of supply. Leading into the top of the tower is the supply-pipe E, through which the copper sulphate solution is introduced into the tower, and leading from the lower portion of the tower is the discharge-pipe F for the solution. The inner end of the discharge-pipe extends down to within a short distance of the air-inlet pipe B.

The above-described apparatus does not form a part of my invention. To successfully operate my new method, any apparatus which affords the requirement for the treatment can be used.

Having thus fully described my invention, I claim as new and desire to secure by Letters Patent—

1. The herein-described method of refining crude cupric sulphate solutions, consisting in first neutralizing the solution, then heating it, adding cupric oxide, and finally injecting air into the solution, to precipitate the impurities in the solution, as set forth.

2. The herein-specified method of eliminating from a solution of cupric sulphate the salts of iron and other metals like arsenic, antimony, nickel and cobalt contained therein as impurities, by neutralizing and heating the solution, then adding cupric oxide, and injecting air in said cupric sulphate solution in which the cupric oxide or oxidized matte is suspended until the iron and other impurities are precipitated.

OTTOKAR HOFMANN.

Witnesses:
R. RUETSCHI,
WM. ALLEN SMITH.